United States Patent
Jablonowski et al.

(10) Patent No.: US 6,834,516 B2
(45) Date of Patent: Dec. 28, 2004

(54) MANUFACTURE OF OPTICAL FIBER PREFORMS USING MODIFIED VAD

(75) Inventors: Donald P. Jablonowski, Dunwoody, GA (US); Thomas E. McDonald, Acworth, GA (US); Fengqing Wu, Duluth, GA (US)

(73) Assignee: Furukawa Electric North America Inc, Norcross, GA (US)

( * ) Notice: Subject to any disclaimer, the term of this patent is extended or adjusted under 35 U.S.C. 154(b) by 269 days.

(21) Appl. No.: 10/131,700

(22) Filed: Apr. 24, 2002

(65) Prior Publication Data

US 2003/0200768 A1 Oct. 30, 2003

(51) Int. Cl.[7] .............................................. C03B 37/07
(52) U.S. Cl. ........................................................ 65/389
(58) Field of Search ............................................ 65/384

(56) References Cited

U.S. PATENT DOCUMENTS

2003/0024273 A1 * 2/2003 Ishihara ........................ 65/382

* cited by examiner

Primary Examiner—John Hoffmann
(74) Attorney, Agent, or Firm—Peter V. D. Wilde

(57) ABSTRACT

Dynamically controlling the reaction temperature at the tip of a soot preform by controlling the flow of hydrogen gas to the core torch provides a wide latitude of control over the temperature range necessary to produce uniform composition of the preform.

11 Claims, 6 Drawing Sheets

MANUFACTURE OF OPTICAL FIBER PREFORMS USING MODIFIED VAD

FIELD OF THE INVENTION

This invention relates to vapor axial deposition (VAD) processes for manufacturing optical fiber preforms.

BACKGROUND OF THE INVENTION

A variety of methods are known for making optical fiber preforms in the manufacture of optical fiber including, for example, Modified Chemical Vapor Deposition (MCVD), Sol-Gel, and Vapor Axial Deposition (VAD). In the VAD method soot preforms are prepared by reacting glass precursors in an oxyhydrogen flame to produce silica particles. The silica particles are deposited on a starting rod. The starting rod is slowly pulled upward while it is rotated, and the silica particles are deposited axially on the rod as it is pulled. Very large, and long, soot preforms can be continuously fabricated. Typically the soot for the core is produced by a core torch and the soot for the cladding by a cladding torch. In this way, the composition of the glass can be varied from the center portion of the prefortm to the outside portion. Variation in glass composition is required for providing the refractive index difference necessary to produce light guiding in the optical fiber. After the soot is deposited, the preform is heated to consolidate the silica particles into a solid transparent glass body. Optical fiber is manufactured by drawing fiber from the consolidated preform using a conventional fiber drawing apparatus.

It has been recognized that the main functional part of an optical fiber is the core and the inner cladding. This part of the fiber carries 99+% of the optical energy. However, it typically consists of but 5% of the mass of the optical fiber. Accordingly, state of the art manufacture often makes use of an inner portion constituting core and inner clad region fabricated by soot deposition using MCVD or VAD, then overcladding the core rod with a material of less demanding properties. Consequently, the overcladding—the bulk of the preform—may be produced by less costly processing. Overcladding may entail direct deposition on the core rod, or may result from using a separate "overcladding tube". Such overcladding tubes have been produced from soot or fused quartz.

A persistent problem with VAD methods is unwanted spatial variations in the composition on the soot preform as the preform is axially pulled. Variations in glass composition radially in the preform (x-y plane, with the x-y plane being the optical fiber cross section) are necessary to produce the light guide as just described. However, composition variations longitudinal of the preform (z-direction) as it is pulled are not desired. These variations lead to changes in the properties of the optical fiber along the length of the fiber.

Typically x-y plane variations are minimized by rotating the preform as it is pulled. However, there is no corresponding expedient for avoiding variations in the z-direction. These are time dependent variations and are produced by dynamic changes in the process conditions. Mostly, they result from changes in temperature, flow rates, and composition of the glass precursors. Of these, controlling the temperature is the most difficult. We have recognized that controlling the temperature of the process at the position where the core reaction occurs, i.e. the tip of the preform, is the important step in controlling the overall process.

European Patent No. EP 0 698 581 A2 describes an attempt to control the tip temperature. In the method described in that patent the temperature of the tip of the soot preform is monitored, and fed back to a flow control. The reaction temperature is dynamically controlled by changing the amount of Ar gas in the combustible mixture. The Ar gas acts as a diluent, so that increasing the Ar flow reduces the reaction temperature, and vice versa. We have found that this has an effect, but the effect is too small to eliminate the temperature fluctuations characteristic of many VAD processes.

SUMMARY OF THE INVENTION

We have developed a method for dynamically controlling the reaction temperature at the tip of a soot preform by controlling the flow of hydrogen gas to the core torch. This method allows significantly improved control of the temperature over the range necessary to eliminate typical variations.

DETAILED DESCRIPTION

Figure 1:
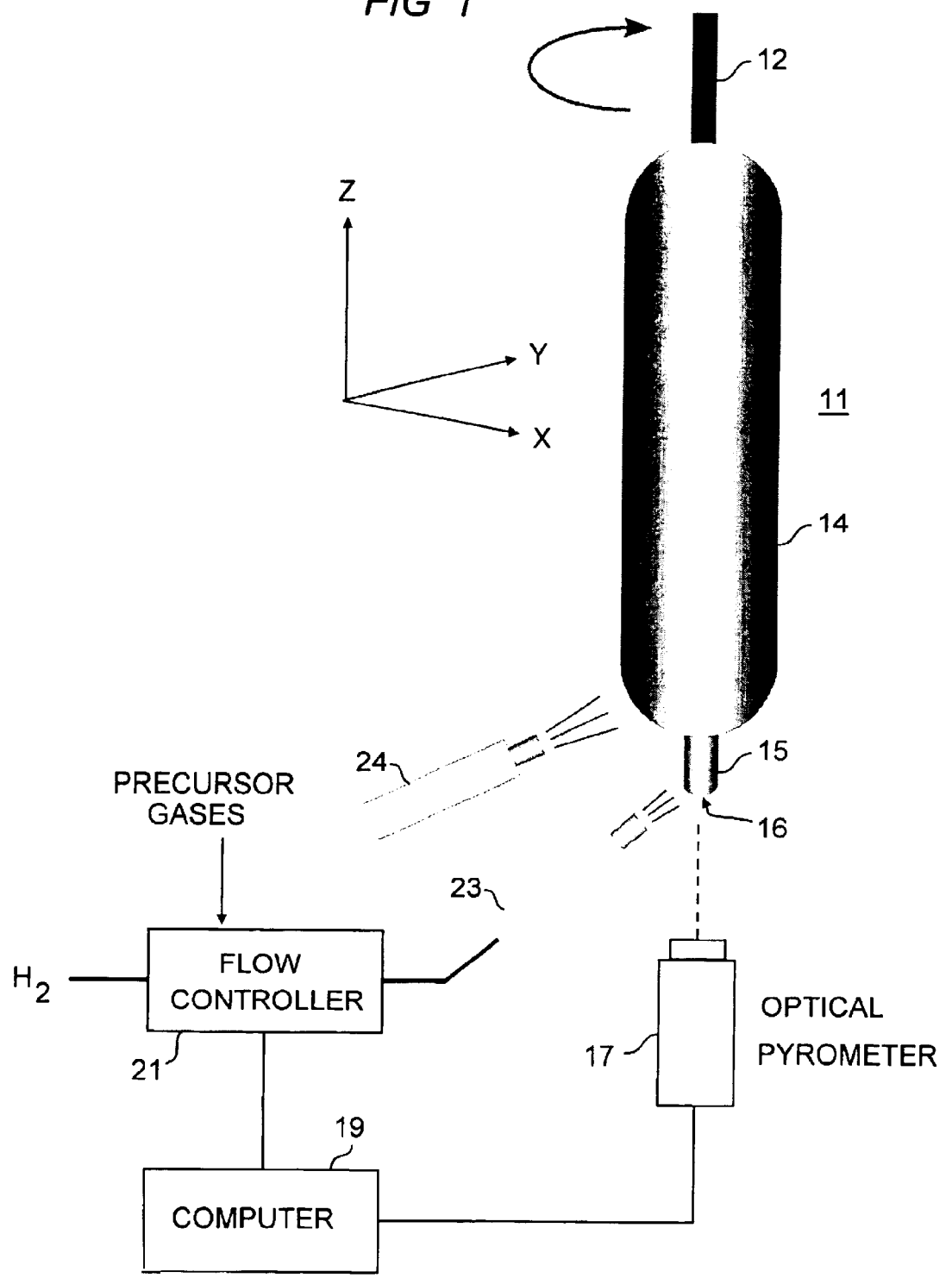
FIG. 1 is a schematic diagram of an apparatus for pulling a VAD preform using the method of the invention.

With reference to FIG. 1, a schematic arrangement for pulling a soot preform is shown. The preform, shown generally at 11, is formed around a support rod 12. The rod is rotated during pulling as indicated by the arrow. The rotation minimizes x-y variations in the preform composition. The x-, y-, and z-axes are shown to the left of the preform. The preform comprises a cladding portion 14, and a core portion 15. The cladding is typically pure silica, or lightly doped silica. The core is typically silica, doped with germania. These combine to produce a preform with a refractive index difference between the core and the cladding. As is well known, the core and cladding may be made with a wide variety of compositions to produce many types of index profiles. For example, the core may be undoped and the cladding down-doped. More than one cladding layer may be made. However, in the most typical embodiment, the core is doped with germanium and the cladding is either undoped or doped with a lower concentration of germanium. Other dopants, such as phosphorus and fluorine may also be used. The main aspect of the invention, i.e. controlling the reaction temperature at the preform tip is applicable to any of these preform compositions.

The z-axis variations, mentioned earlier, result primarily from temperature variations at the tip 16. If the reaction temperature changes, the chemical composition changes, and/or the soot density may change. As a result of either or both, the refractive index changes. As the preform is pulled in the z-direction, these changes produce a longitudinal variation in the preform, which later produces an optical fiber with light guiding properties that change with distance along the fiber.

To implement the invention, the reaction temperature at the tip 16 is monitored by optical pyrometer 17. The actual temperature is typically in the range 500–800° C. The temperature reading is fed back to computer 19, which computes the control action sent to flow controlling unit 21. The flow controlling unit controls the flow of hydrogen to the core torch 23. Torch 23 is an oxyhydrogen torch with a flame fed by oxygen and hydrogen to control the temperature of the reaction zone in a known fashion. The torch assembly also feeds precursor glass gases to the reaction zone at 16. The glass precursor gases may be fed to the torch 23 also through flow controlling unit 21. The glass precursor gases typically comprise $SiCl_4$ and $GeCl_4$ in an inert carrier gas.

A similar torch 24 is used to form the soot for the cladding.

The following examples are provided to demonstrate the invention.

EXAMPLE 1

A soot preform was prepared using the dual torch arrangement shown in FIG. 1. The soot preform was pulled at a rate that typically varies over the range 40–100 mm/hr. The pulling speed is automatically adjusted according to the growth rate of soot on the preform. The growth rate of soot is monitored by a laser that tries to maintain the deposition tip's z position as the soot preform grows. The pulling speed is obtained by measuring the z-axis displacement of the pulling rod 12 in FIG. 1. The flow rate for $SiCl_4$ was 150 cc/min and the flow rate for $GeCl_4$ was 15 cc/min. Flow rates of the gases supplied to the torch 23 and 24 will vary widely depending on the design of the apparatus used. Therefore these, and other, specific values just by way of example only. The temperatures recorded at the tip varied from 500–800° C. depending on the process conditions. In this example the flow rate of Ar was varied between approximately 0.52 and 0.78 liters (L)/minute (min). The effect of varying the Ar flow rate on the tip temperature was recorded. The effect of varying the Ar flow rate on pulling rate was also recorded.

EXAMPLE 2

The same general method described in Example 1 was followed except that in this example the flow rate of hydrogen was varied, keeping the other parameters fixed. The effect of this on tip temperature, and on pulling rate, was recorded.

Figure 2:
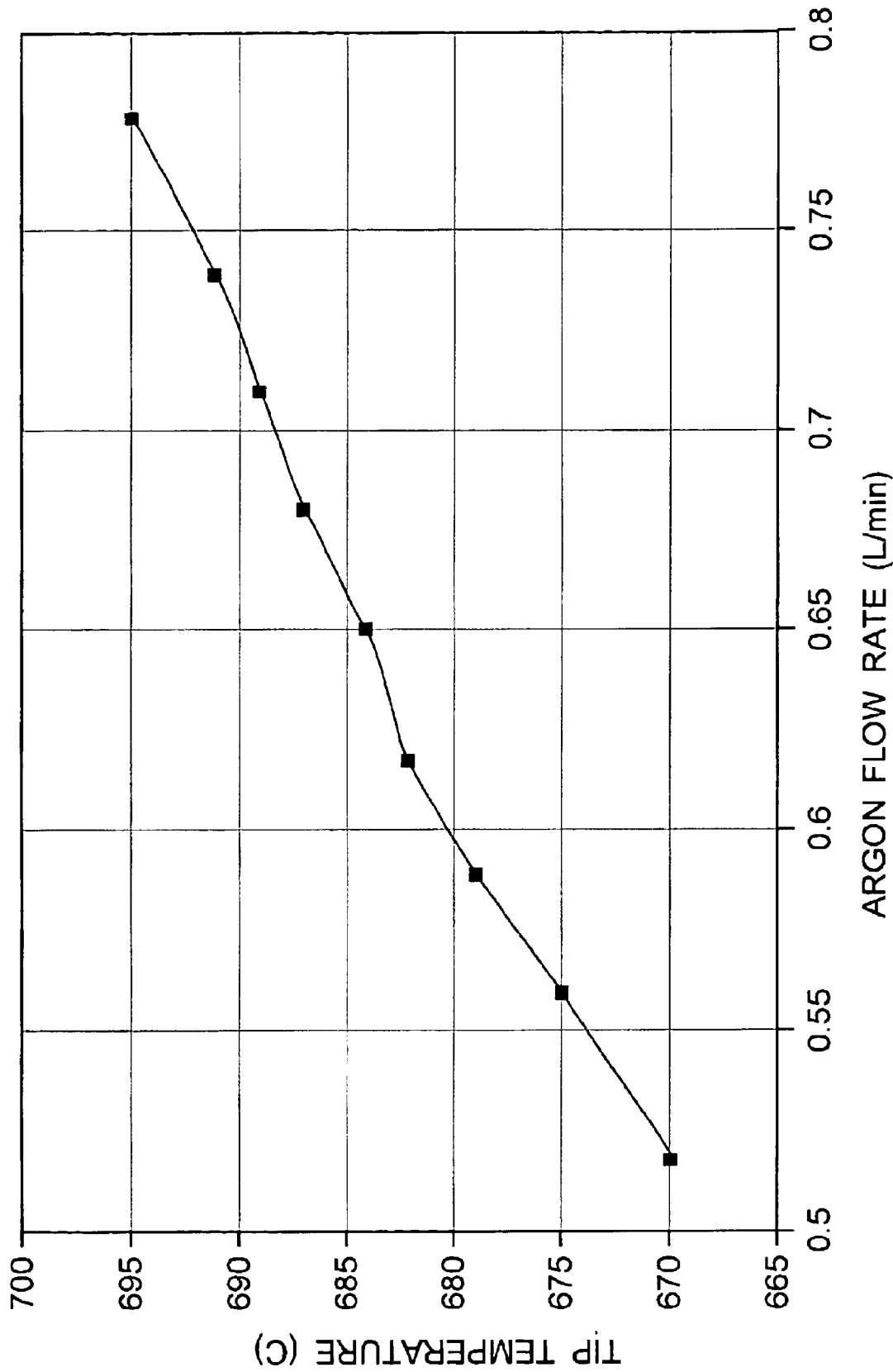
FIG. 2 is a plot of tip temperature vs. argon flow rate to the core torch.
Figure 3:
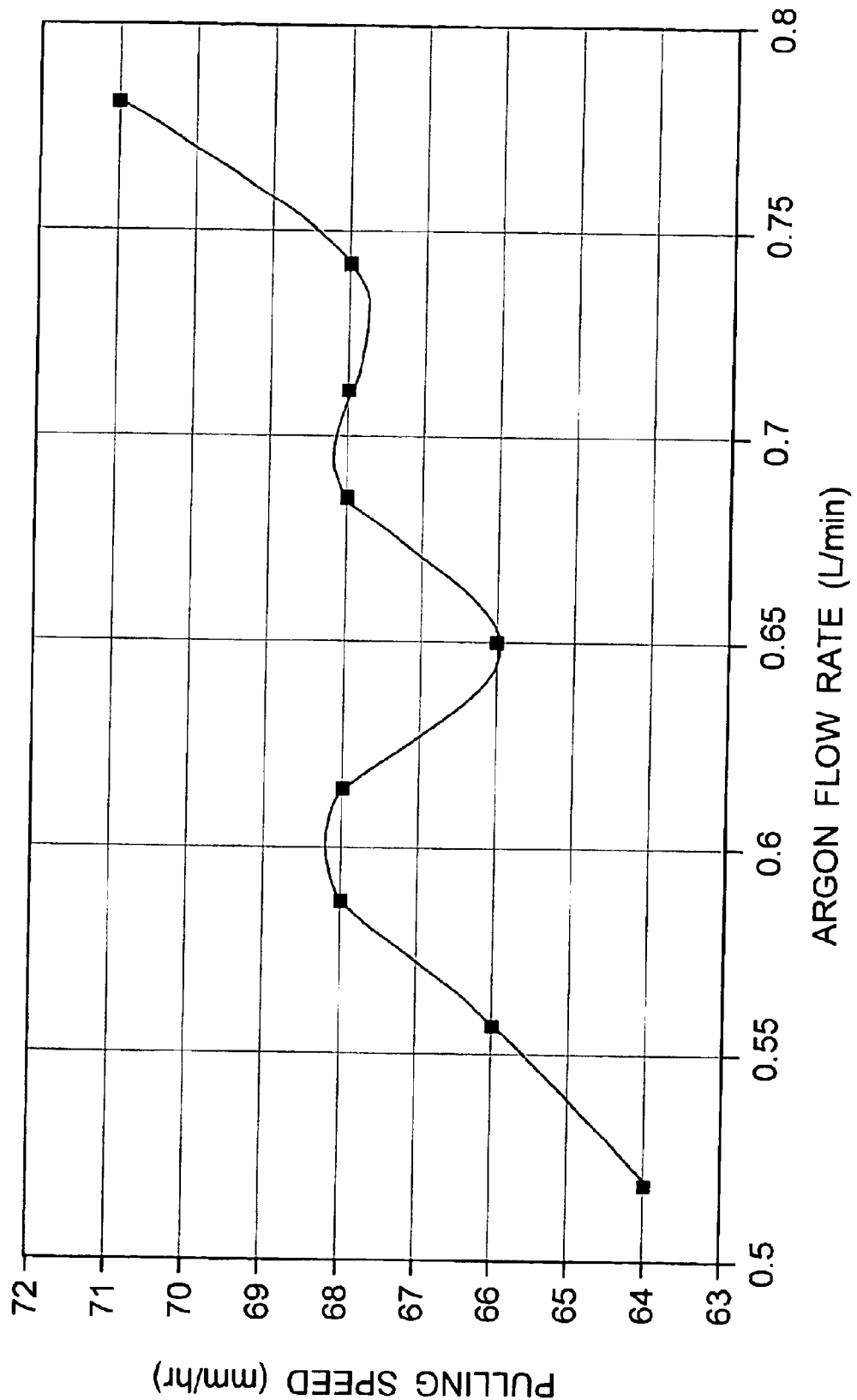
FIG. 3 is a plot of pulling speed vs. argon flow rate to the core torch.
Figure 4:
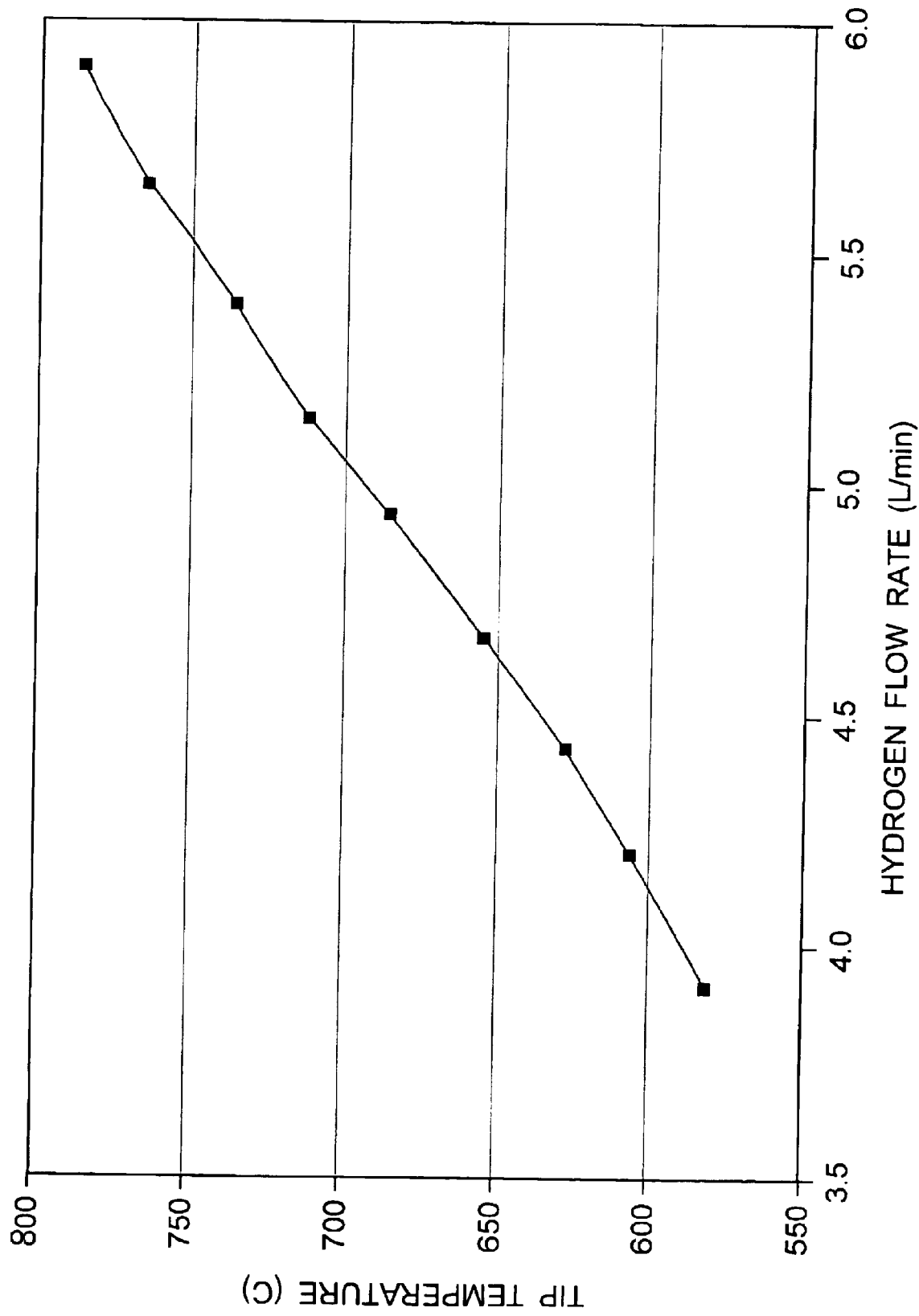
FIG. 4 is a plot of tip temperature vs. hydrogen flow rate to the core torch.
Figure 5:
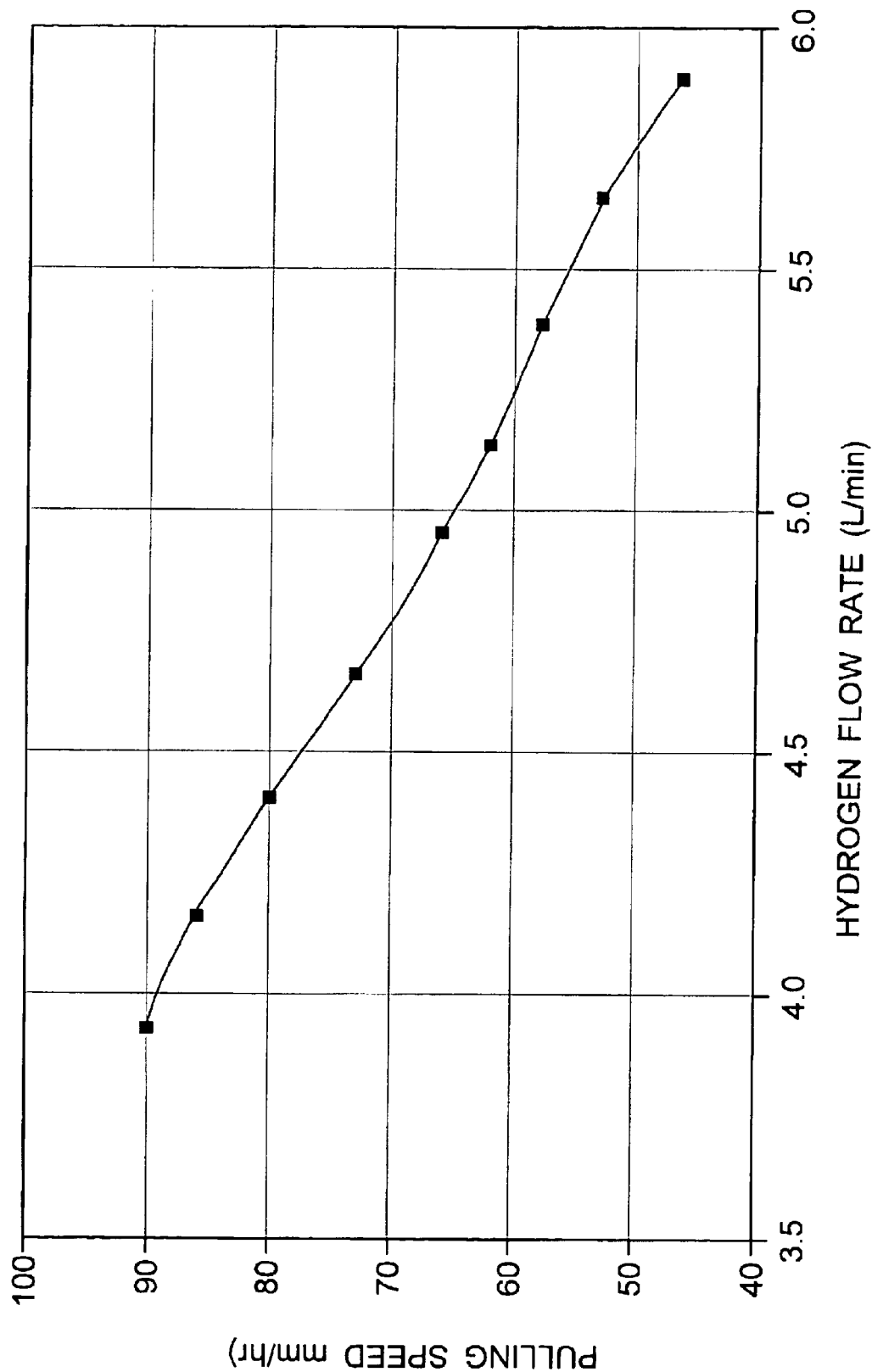
FIG. 5 is a plot of pulling speed vs. hydrogen flow rate to the core torch.

The results of the measurements made in examples 1 and 2 are plotted in FIGS. 2–5. The measurements were made on preforms before consolidation, i.e. during the soot process, because this is when the monitoring method of the invention is required. FIG. 2 shows data for argon flow rate to the core torch vs. tip temperature. FIG. 3 shows data for argon flow rate to the core torch vs. pulling speed. FIG. 4 shows data for hydrogen flow rate to the core torch vs. tip temperature. FIG. 5 shows data for hydrogen flow rate to the core torch vs. pulling speed.

The data of FIG. 2 shows clearly that the argon flow rate influences the tip temperature, but only over a relatively small range. The ability to change the argon flow rate beyond this range is limited. We have found that if the flow rate is increased beyond a limited range, the flame becomes unstable, and deposition is non-uniform. If the flow rate is reduced too far the torch overheats. We also found that even over the limited range shown in FIG. 2, the deposition rate varied significantly. This is shown in FIG. 3, where the curve of pulling speed vs. flow rate actually shows inflection points. This variation in deposition rate is unacceptable, and causes non-uniformities in the preform properties.

From the data of FIG. 3, it is concluded that a uniform deposition rate occurs only over an argon flow rate change of less than 0.1 L/min. From the data of FIG. 2 it is seen that the expedient of changing the argon flow rate would allow a tip temperature adjustment of approximately 5° C. Experience with actual preform production shows that an adjustment capability of this magnitude is not sufficient to provide the control desired.

The data showing the effect of changing the hydrogen flow rate is given in FIGS. 4 and 5. FIG. 4 shows that the tip temperature can be varied over a range of more than 200° C., i.e. from 575° C. to over 775° C. FIG. 5 shows that the deposition rate over this large range of hydrogen flow rate variation is very stable. It is seen therefore that adjusting hydrogen flow rate provides a far more reliable and useful method for controlling tip temperature than adjusting the argon flow rate. As a general goal, it is desired that the variation of deposition rate with temperature in response to hydrogen flow rate control be monotonic, and preferably uniform to +/−0.2 slope, over a temperature range of 50° C.

After deposition of the soot and formation of the porous soot preform, the porous body is then consolidated by heating to a temperature sufficient to melt the silica particles into a solid, dense, glass preform. Consolidation is typically performed by heating the soot body to a temperature of 1400° C. to 1600° C. The solid preform is then ready for mounting in a fiber draw apparatus and drawing optical fiber, which will be discussed below.

Figure 6:
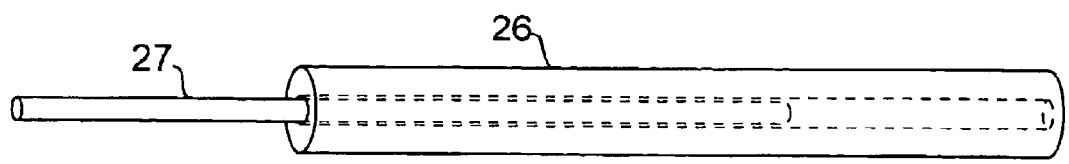
FIGS. 6 and 7 are schematic representations of a rod and tube process for making a preform using a VAD core rod.
Figure 7:
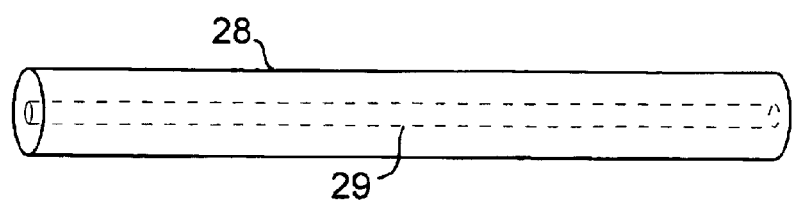

The examples described are useful for producing a variety of types of preforms. However, the most demanding aspect of preform manufacture involves the formation of the core and the primary cladding. This is the region where composition changes are most critical, and control of the reaction temperature requires the most precision. As indicated earlier, outside cladding may be made using other, less expensive, techniques. Accordingly a preferred embodiment of this invention is the use of a rod-in-tube process. A typical rod-in-tube approach is shown in FIGS. 6 and 7. The drawing is not to scale. The cladding tube is shown in FIGS. 6 and 7 at 26. A typical length to diameter ratio is 10–15. The core rod 27 is shown being inserted into the cladding tube. The rod at this point is typically already consolidated. In an alternative overcladding method cladding soot is deposited on top of a core rod. As mentioned above, there exist several common options for the composition of the core rod. It may be pure silica, with a down doped cladding. It may have a pure silica center region with a down doped outer core region. It may have an up-doped, e.g. germania doped, center core region surrounded by a pure silica region. It may have an up-doped center core region surrounded by a down doped outer core region. All of these options are well known in the art and require no further exposition here. After assembly of the rod 27 and tube 26, the combination is sintered to produce the final preform 28 shown in FIG. 7, with the core 29 indistinguishable from the cladding except for a small refractive index difference.

Typical dimensions of the rod and cladding tube are also well known. The diameter of a consolidated cladding tube for a standard multi-mode fiber is approximately twice the diameter of the core rod. In the case of a preform for a single mode fiber the diameter of the rod is approximately 5% of the final diameter of the cladding tube.

Figure 8:
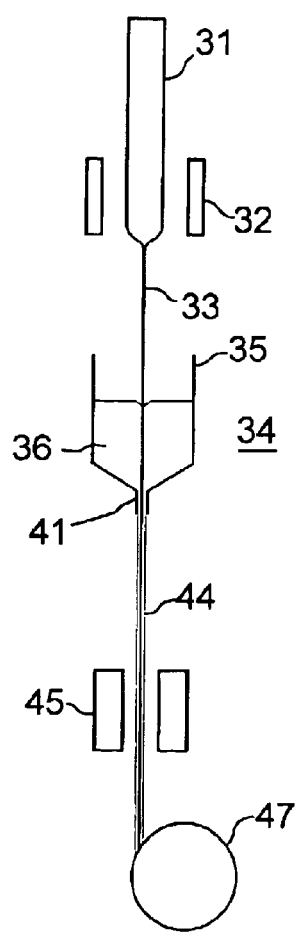
FIG. 8 is a schematic representation of a fiber drawing apparatus useful for drawing preforms, made by the invention, into continuous lengths of optical fiber.

The completed preform is then used for drawing optical fiber in the conventional way. FIG. 8 shows an optical fiber drawing apparatus with preform 31 and susceptor 32 representing the furnace (not shown) used to soften the glass preform and initiate fiber draw. The drawn fiber is shown at 33. The nascent fiber surface is then passed through a coating cup, indicated generally at 34, which has chamber 35 containing a coating prepolymer 36. The liquid coated fiber from the coating chamber exits through die 41. The combination of die 41 and the fluid dynamics of the prepolymer, controls the coating thickness. The prepolymer coated fiber 44 is then exposed to UV lamps 45 to cure the prepolymer and complete the coating process. Other curing radiation may be used where appropriate. The fiber, with the coating cured, is then taken up by take-up reel 47. The take-up reel controls the draw speed of the fiber. Draw speeds in the range typically of 1–20 m/sec. can be used. It is important that the fiber be centered within the coating cup, and particularly within the exit die 41, to maintain concentricity of the fiber and coating. A commercial apparatus typically has pulleys that control the alignment of the fiber. Hydrodynamic pressure in the die itself aids in centering the fiber. A stepper motor, controlled by a micro-step indexer (not shown), controls the take-up reel.

Coating materials for optical fibers are typically urethanes, acrylates, or urethane-acrylates, with a UV photoinitiator added. The apparatus in FIG. 8 is shown with a single coating cup, but dual coating apparatus with dual coating cups are commonly used. In dual coated fibers, typical primary or inner coating materials are soft, low modulus materials such as silicone, hot melt wax, or any of a number of polymer materials having a relatively low modulus. The usual materials for the second or outer coating are high modulus polymers, typically urethanes or acrylics. In commercial practice both materials may be low and high modulus acrylates. The coating thickness typically ranges from 150–300 μm in diameter, with approximately 240 μm standard.

Reference herein to silica preforms means highly pure silica bodies. The silica base material for optical fiber preforms necessarily excludes impurities such as water or iron. They may however, include small amounts of dopants, such as fluorine, for modifying refractive index. Typical optical fiber is more than 85% silica by weight.

In concluding the detailed description, it should be noted that it will be obvious to those skilled in the art that many variations and modifications may be made to the preferred embodiment without substantial departure from the principles of the present invention. All such variations, modifications and equivalents are intended to be included herein as being within the scope of the present invention, as set forth in the claims.

What is claimed is:

1. Process for the manufacture of a preform of silica particles on a starting rod the preform having a core region comprising the steps of:
   (a) rotating the starting rod;
   (b) flowing together:
       a flow of glass precursor gases,
       a flow of hydrogen,
       and a flow of oxygen,
       to form a first gas mixture,
   (c) igniting the first gas mixture to form a flame and to produce soot,
   (d) directing the flame onto the starting rod to deposit soot to form the core region of the preform,
   (e) continuing to deposit soot to form the core region of the preform while continuously measuring the temperature of the core region to obtain temperature measurements, and
   (f) changing the flow of hydrogen in response to the temperature measurements.

2. The process of claim 1 wherein the first gas mixture is fed to a core torch.

3. The process of claim 1 further including the steps of flowing together one or more glass precursor gases, hydrogen, and oxygen, to form a second gas mixture, igniting the second gas mixture to form a second flame and produce soot, and directing the second flame onto the preform to deposit soot on the preform, and wherein the soot produced by the first flame has a composition different than the soot produced by the second flame.

4. The process of claim 3 wherein the second gas mixture is fed to a cladding torch.

5. The process of claim 4 wherein the glass precursor gases in the first gas mixture comprise $SiCl_4$ and $GeCl_4$.

6. The process of claim 5 wherein the second gas mixture comprises $SiCl_4$, hydrogen and oxygen.

7. The process of claim 5 wherein the temperature measurements are made by an optical pyrometer.

8. The process of claim 1 wherein a change in rate of soot deposition with temperature in response to change in hydrogen flow rate is monotonic over a range of at least 50° C.

9. The process of claim 1 wherein a change in rate of soot deposition with temperature in response to change in hydrogen flow rate is uniform to within +/−0.2 slope over a range of at least 50° C.

10. The process of claim 1 further including heating the soot preform to consolidate the soot into a solid glass preform.

11. Process for the manufacture of optical fibers comprising:
   (a) preparing a preform, the preform having a core region comprising the steps of:
       (i) rotating a starting rod,
       (ii) flowing together: a flow of glass precursor gases, a flow of hydrogen, and a flow of oxygen, to form a first gas mixture,
       (iii) igniting the first gas mixture to form a flame and to produce soot,
       (iv) directing the flame onto the starting rod to form the core region of the preform,
       (v) continuing to deposit soot to form the core region of the preform while continuously measuring the temperature of the core region to obtain temperature measurements,
       (vi) changing the flow of hydrogen in response to the temperature measurements,
       (vii) heating the preform to consolidate the preform into solid glass,
   (b) mounting the preform in an optical fiber drawing apparatus,
   (c) heating the preform to soften the glass, and
   (d) drawing an optical fiber from the preform.

* * * * *